United States Patent
Weisbuch et al.

(10) Patent No.: US 7,053,882 B2
(45) Date of Patent: May 30, 2006

(54) DISPLAY APPARATUS

(75) Inventors: Claude Weisbuch, Paris (FR); Weijia Wen, Kowloon (HK); Ping Sheng, Kowloon (HK); Che Ting Chan, Clear Water Bay (HK); Weikun Ge, New Territories (HK)

(73) Assignee: ER Display Limited, Central (HK)

( * ) Notice: Subject to any disclaimer, the term of this patent is extended or adjusted under 35 U.S.C. 154(b) by 267 days.

(21) Appl. No.: 10/622,448

(22) Filed: Jul. 21, 2003

(65) Prior Publication Data

US 2005/0017943 A1    Jan. 27, 2005

(51) Int. Cl.
*G09G 3/34*   (2006.01)

(52) U.S. Cl. .............. 345/107; 345/208; 359/296; 359/254

(58) Field of Classification Search ............. 345/107
See application file for complete search history.

(56) References Cited

U.S. PATENT DOCUMENTS

| 6,795,229 B1 * | 9/2004 | Liang et al. ............. 359/296 |
| 2003/0231162 A1 * | 12/2003 | Kishi .................... 345/107 |
| 2004/0119680 A1 * | 6/2004 | Daniel et al. ............ 345/107 |
| 2004/0263946 A9 * | 12/2004 | Liang et al. ............. 359/296 |

OTHER PUBLICATIONS

A. Van Blaaderen et al., "Synthesis and Characterization of Colloidal Dispersions of Fluorescent, Monodisperse Silica Spheres", *Langmuir*, 1992, pp. 2921-2931, vol. 8, American Chemical Society.

* cited by examiner

*Primary Examiner*—Kent Chang
*Assistant Examiner*—Seokyun Moon
(74) *Attorney, Agent, or Firm*—Buchanan Ingersoll PC

(57) ABSTRACT

A "paper look-alike" display comprises pixels formed of dielectric particles suspended in a non-conducting liquid. By applying a voltage to electrodes the particles may be switched between positions in which they are stored in vertical columns normal to the surface of the pixel and have no effect on the color of the pixel, and a position in which they occupy a major part of the surface area of the pixel and influence the color of the pixel accordingly.

9 Claims, 4 Drawing Sheets

Pictures taken for a real prototype:
Upper panel: Electric field off
Lower panel: Electric field on. Field strength= 40 V/mm.
BaTiO$_3$ particles (50nm diameter) suspended in silicone oil Another picture showing that the ER particles aggregate forming a particular pattern Electric field ~ 30 to 50 V/mm

DISPLAY APPARATUS

FIELD OF THE INVENTION

The present invention relates to an electronic display apparatus, and in particular in its preferred forms at least to a low-cost ultra-low power display that can be relatively thin and can be formed as a "paper look-alike" display.

BACKGROUND OF THE INVENTION

A wide range of different types of electronic displays is known. These range from traditional cathode-ray tube (CRT) devices, to liquid crystal displays (LCDs), and to contemporary thin film transistor LCDs.

One area of research has been to try and produce an electronic display of relatively low-cost that can be formed with low power consumption, can be relatively thin and sheet-like, and which can thus form a paper-like display. One approach that has been taken in trying to develop such displays is to use the phenomenon of electrophoresis, the migration of charged particles in an electric field.

PRIOR ART

Electrophoretic (EP) image displays are based on the transport of charged pigment particles in a colloidal suspension by means of an applied electric field. The particles are submicron in size and are electrically charged to the same polarity. The suspending liquid is usually non-aqueous and is dyed to a colour to contrast with the pigment particles. A simple cell of an EP image display consists of a thin layer of the suspension sandwiched between transparent electrodes formed on two glass plates. Upon application of an electric field to the electrodes, the particles will be drawn to the electrode of the opposite polarity to the particles. Thus the particles may either be drawn towards the front glass plate of the display in which case the primary colour of the display will be the colour of the particles, or the particles may be driven to the back glass plate of the display and the colour of the cell will be dominated by the colour of the suspension.

Another known display apparatus uses bichromal beads. A very large number of beads are dispersed in a thin layer of transparent plastic. The beads (each contained in an oil-filled cavity) have one hemisphere of one colour, and another hemisphere of another colour and the two contrasting hemispheres are oppositely charged. When a voltage is applied to the surface of the sheet, the beads may rotate to present one side to the viewer depending on the charge applied to the sheet.

Another known display comprises an "electronic ink" which may be printed onto a sheet of plastic film. This "ink" comprises positively charged white particles, and negatively charged black particles. If a negative electric field is applied to a part of the surface then the white particles will be drawn upwardly and that part of the surface will appear white. If a positive electric field is applied, that part of the surface will appear black.

Such known displays have found a number of practical applications, including for example the fabrication of small and simple numeric displays such as in-store signs. However, they also suffer from a number of drawbacks that have prevented more wide scale application. These drawbacks and problems include agglomeration, clustering, pigment migration, leakage and electrochemical effects.

SUMMARY OF THE INVENTION

According to the present invention there is provided an electronic display apparatus comprising; parallel first and second surfaces divided into a plurality of pixels by orthogonal side walls, each said pixel being filled by coloured dielectric particles suspended in a liquid, and electrodes formed on both the first and second surfaces, and wherein said display is operable in two modes: a first said mode wherein voltages of opposed signs are applied to electrodes on the first and second surfaces causing said particles to be aligned between the first surface electrodes and the second surface electrodes such that the colour of the particles does not significantly contribute to the colour of the pixel; and a second mode wherein voltages of opposed signs are applied to alternate electrodes on the first said surface and no voltage is applied to the electrodes on the second said surface such that the colour of the particles does determine the colour of the pixel.

BRIEF DESCRIPTION OF THE DRAWINGS

Some embodiments of the invention will now be described by way of example and with reference to the accompanying drawings, in which:—

DETAILED DESCRIPTION OF PREFERRED EMBODIMENTS

A display device according to an embodiment of the present invention is based upon the electrorheological properties of dielectric particles suspended in a liquid. The particles are normally neutral, but upon application of an electric field (which may be either a DC or a low-frequency AC field, eg 50 Hz) become polarized and experience a variety of forces. In particular dielectric particles may experience an electro-rheological effect in which dielectric particles suspended in a liquid will align themselves in columns because of field induced dipole-dipole interactions. This alignment can be very fast, for example on a timescale that is typically one hundredth of a second.

Figure 1:
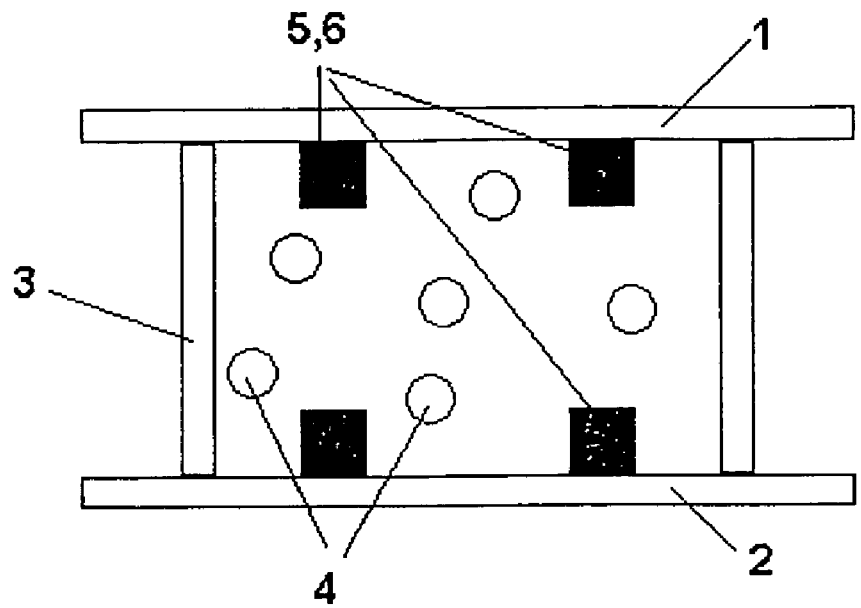
FIG. 1 is a cross-sectional view of a display according to a first embodiment of the invention.

Referring firstly to FIG. 1 there is shown a cross-sectional view of the structure of a single pixel of a display according to a first embodiment of the invention. It will of course be understood that the complete display will consist of a matrix of a very large number of pixels each independently drivable. For the simplicity of illustration, however, only a single pixel will be described and illustrated in detail. It will also be understood that the relative sizes of the pixel, electrodes and particles are not shown accurately in the Figures which are simply illustrative. Typically a pixel may be, for example, of a dimension from 20 to 200 microns.

The display is formed of two generally planar and generally parallel walls 1,2. Wall 1 is a transparent top wall, while wall 2 is a bottom wall, which is preferably opaque and formed of any desired background colour. Walls 1,2 are divided into individual pixels by a rectangular array of encapsulating walls 3 that are orthogonal to the walls 1,2 (see FIG. 4 in addition to FIG. 1).

Each pixel therefore includes a space defined by top wall 1, bottom wall 2, and four side walls 3. This space is filled with a plurality of dielectric particles 4 suspended in a non-conducting fluid. Suitable types of particles and fluids will be discussed further below, but it should be noted here that instead or in addition to forming the bottom wall 2 of a desired colour, the fluid could be formed of a desired colour by the use of dye. It should also be noted that the particles may be of any desired colour, but as will become evident from the following they should be formed of a different colour from the fluid and the bottom wall 2.

Figure 4:
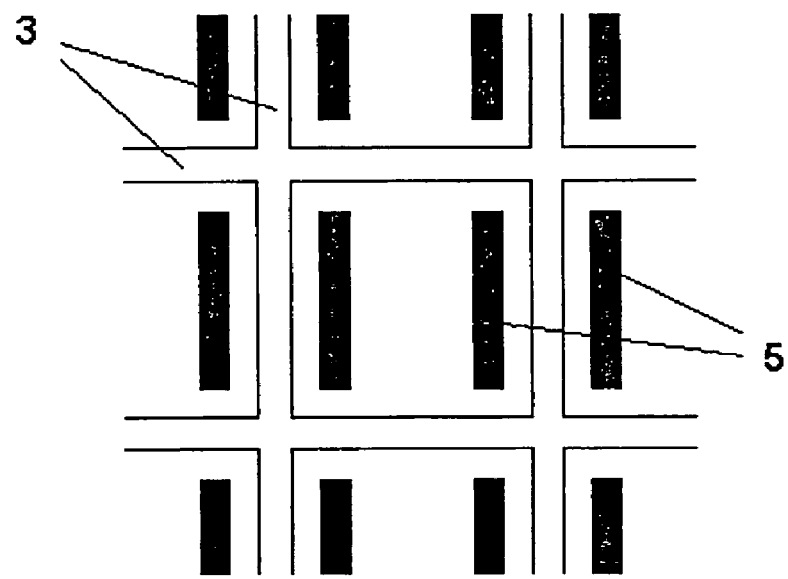
FIG. 4 is a partial top view of the display of FIG. 1, and FIGS. 5(a) and (b) are photographs showing an embodiment of the invention in (a) no voltage is applied, and (b) voltage is applied to the electrodes.

As can be seen from FIG. 1, the inner surfaces of the top 1 and bottom walls 2 are provided with a plurality of electrodes. The electrodes 5 formed on the inner surface of the top wall 1 are the same in number and position to the electrodes 6 formed on the inner surface of the bottom wall 2. Referring to FIG. 4 it will be seen that the electrodes have a length that is close to the length of one side of the pixel. As a consequence of this the area of the pixel between the two top electrodes 5 is a large fraction of the total pixel area, and the significance of this will be understood from the following description.

Figure 2:
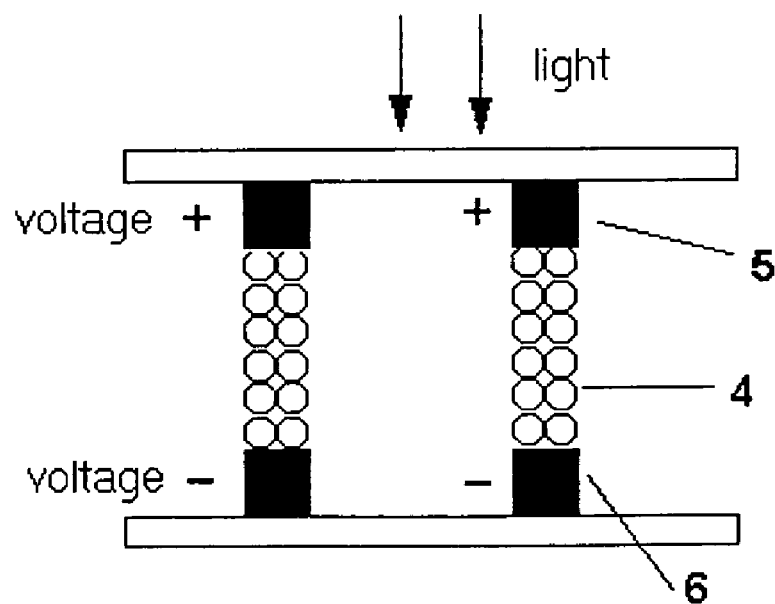
FIG. 2 is a view similar to FIG. 1 but showing the display in a transparent storage mode.

FIG. 1 shows the display with no voltage applied to the electrodes 5,6 and the particles 4 are simply uniformly dispersed throughout the pixel. FIG. 2 shows a first operational mode of the display (which may be termed a "transparent" or "storage" mode) in which opposite voltages are applied to the pairs of electrodes 5,6. In this example the electrodes 5 formed on the top wall 1 are given a positive voltage, while the electrodes 6 formed on the bottom wall 2 are given a negative voltage, but the signs of the voltages applied to the electrodes could be reversed. In this mode of operation the dielectric particles will align themselves between the top and bottom electrode pairs 5,6 as shown in FIG. 2 and are "stored" therebetween. It should be understood here that in the figures the relative size of the particles and electrodes compared to the pixel is somewhat exaggerated for the sake of clarity of the illustration.

Thus when opposite voltages are applied to the top and bottom electrodes 5,6 the particles 4 become aligned vertically (ie orthogonally to the top and bottom walls 1,2). Thus when light is incident on the top wall 1 as shown in FIG. 2, the particles 4 have no significant contribution to the colour of the display, which is instead dictated, by the colour of the bottom wall if the fluid is transparent, or the intrinsic colour of the fluid.

Figure 3:
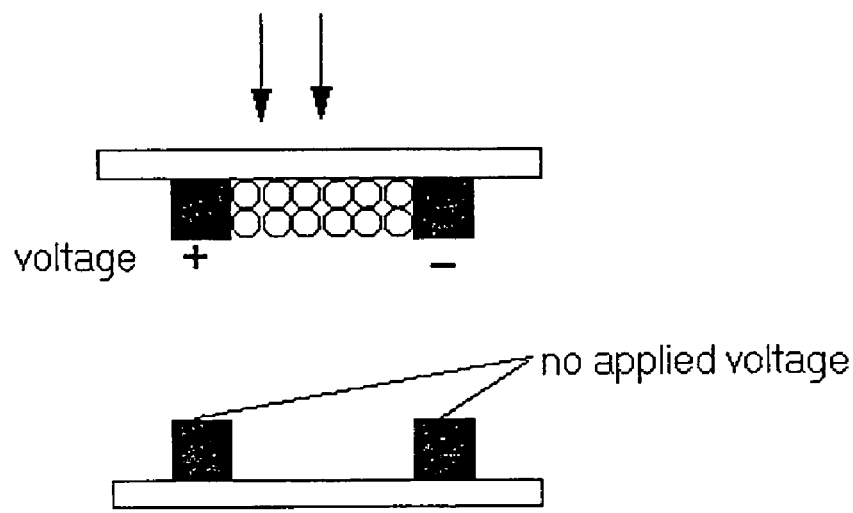
FIG. 3 is a view similar to FIGS. 1 and 2 but showing the display in a writing mode.

FIG. 3 shows a second operational mode of the display, which may be termed a display mode. In this mode no voltage at all is applied to the electrodes 6 on the bottom wall, and instead positive and negative voltages are applied to alternative top electrodes 5. This causes the particles 4 to align themselves in a horizontal manner (ie parallel to the top surface 1) between the top electrodes 5. Since the area defined between the top electrodes is a large fraction of the surface area of the pixel, in this mode the particles substantially block incident light from entering the pixel and the colour of the pixel is dictated by the colour of the particles 4.

Once written the patterns may be stable for several hours at room temperature even after the voltage has been switched off. This extended memory effect means that the voltage only has to be applied when the pattern is being changed, or at least only intermittently if it is desired to maintain a pattern for a very long time, and so the display may have very low power consumption.

It will therefore be understood that by switching between the modes shown in FIGS. 2 and 3 the pixel may be caused to change colour. In the operational mode shown in FIG. 2 the colour of the pixel is the colour of the bottom wall 2 if the fluid is transparent, or a combination of the colour of the bottom wall 2 and the colour of the fluid if the fluid is provided with a dye. In the operational mode of FIG. 3, the colour of the pixel is the colour of the dielectric particles. If these two colours are chosen with a sufficient contrast, then it will be understood that a plurality of such pixels can be combined to form a monochrome array. When no voltage is applied to any of the electrodes 5,6 then the particles 4 will tend to disperse generally as shown in FIG. 1 and the display is in a passive non-operational mode.

It should be noted that in the above embodiments the display electrodes are provided on the inner surface of the top wall 1. It should be recognized, however, that the display electrodes could equally be defined on the inner surface of the bottom wall 2 if the fluid was transparent or if the display was being operated in a transmissive mode.

While in the embodiments described above two electrodes are provided on the interior of the top wall, and two electrodes are provided on the interior of the bottom wall, it will be understood that more than two electrodes can be provided to each wall, though the number of electrodes on the top wall should match the number of electrodes on the bottom wall. The electrodes on the top wall should generally overly their counterparts on the bottom wall.

It should be noted that in the above embodiments the display electrodes are provided on the inner surface of the top wall 1. It should be recognized, however, that the display electrodes could equally be defined on the inner surface of the bottom wall 2 if the fluid was transparent or if the display was being operated in a transmissive mode.

It should also be noted that while in the above embodiments the particles are caused to change their position from being accumulated between a first pair of electrodes (eg a pair of storage electrodes) and to reassemble between a second pair of electrodes (eg display electrodes) by the removal of an applied voltage from the first pair of electrodes, and by applying a voltage to the second pair, this process may be assisted by providing an "erase" mode in which a voltage is applied to the first pair of electrodes of a nature to positively encourage the break-up of the accumulation of particles between the first pair of electrodes. For example, if particles are being stored between an electrode on the upper surface that is given a positive voltage, and an electrode on the bottom surface that is given a negative electrode, the polarities of these two electrodes may first be reversed to positively break up the agglomeration of particles between those electrodes, before applying a voltage only to the upper surface electrodes.

The dielectric particles may be any small submicron sized particles capable of exhibiting an electrorheological effect, and the colour of which may be controlled. Possible types of particles include submicron silica spheres prepared by the method described in A. V. Blaaderen and A. Vrij: *Synthesis and Characterization of Colloidal Dispersions of Fluorescent, Monodisperse Silica Spheres*, Langmuir 1992, 8, 2921–2931. An advantage of such silica particles it is possible to incorporate dyes or fluorophores through covalent bonding into the silica particles.

An alternative to silica particles would be submicron sized metallo-dielectric particles that are formed with a dielectric core provided with a metallic coating. The metallic coating provides one way for the colour of the particles to be controlled. Furthermore metallodielectric particles are known to have an electrorheological response at lower voltage electric fields than silica particles, which would assist in making the display a low power display. Another possibility is to use hollow spheres with a smaller density than solid-core particles. Hollow particles can be density matched to the liquid so as to avoid sedimentation effects which can be a potential problem in any system that uses particles suspended in a liquid. The particles are preferably spherical, though this is not in fact essential.

In addition to silica particles, particles of $TiO_2$ or $BaTiO_3$ may also be used. It should be understood, however, that these are examples only and many other types of dielectric particles may also be used.

The liquid must be a non-conducting liquid, for example a silicone oil. Preferably the liquid should have a relatively high viscosity since that would limit liquid flow from the cell in the event of breakage.

Figure 5:
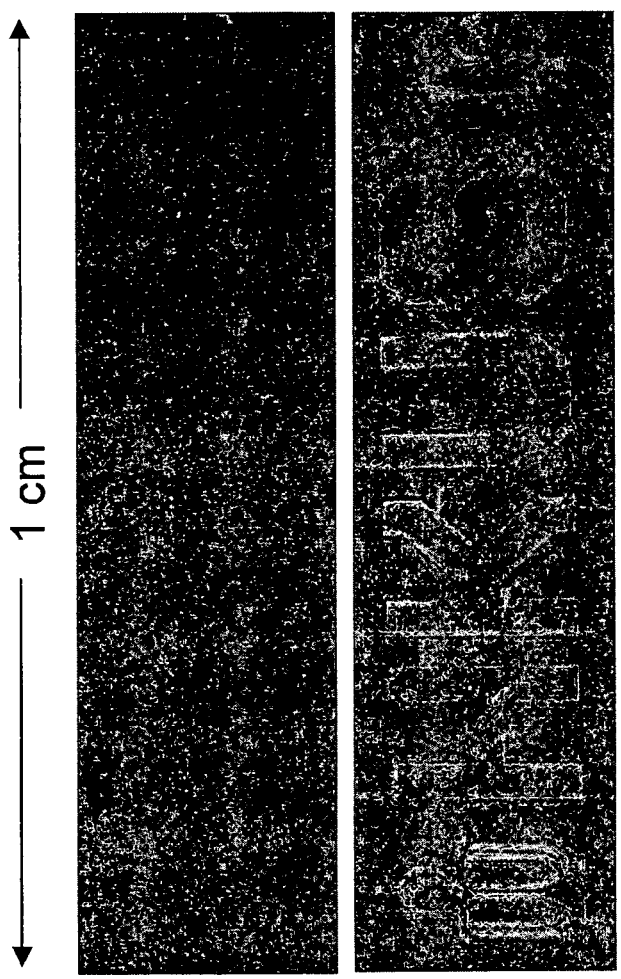
Figure 5:
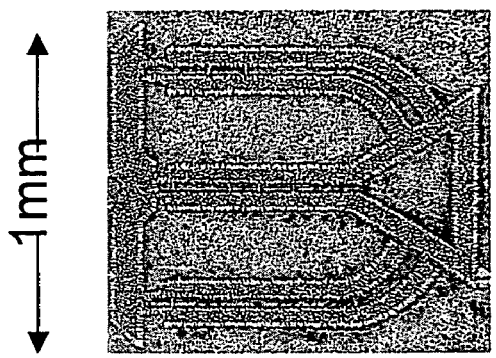

The above embodiments describe examples of the invention in which a display is formed of multiple pixels that are selectively addressable to form different images. Another possibility, however, is that a single fixed image could be created by forming an electrode in the shape of the desired image. An example of such an embodiment (and which also serves to demonstrate the effectiveness of the general concept of this invention) is shown in FIGS. 5(a) and (b). In this embodiment a single cell is formed approximately 1 cm in length and is filled $BaTiO_3$ particles (50 nm diameter) suspended in silicone oil. Six electrodes are formed on the interior surface of the upper surface of the cell: one shaped to correspond to a desired logo, the other five having the shapes H, K, U, S and T. Six correspondingly shaped electrodes are formed on the interior of the bottom surface of the cell directly beneath these upper electrodes.

When no voltage is applied to the electrodes the particles are uniformly dispersed in the silicone oil and if they are suitably coloured (for example the same colour as the electrodes) the cell will be generally uniform and no pattern will be visible as in the upper half of FIG. 5(a). However, if a voltage is applied between the pairs of upper and lower electrodes (40 V/mm field strength) the particles will align themselves between the electrode pairs and will not influence the appearance of the cell, which will instead be dictated by the contrast in colour between the silicone oil and the electrodes. If there is a sufficient contrast the electrodes will become visible as shown in the lower half of FIG. 5(a).

What is claimed is:

1. An electronic display apparatus comprising; parallel first and second surfaces divided into a plurality of pixels by orthogonal side walls, each said pixel being filled by coloured dielectric particles suspended in a non-conducting liquid, and electrodes formed on the interior of both the first and second surfaces, and wherein said display is operable in two modes: a first said mode wherein voltages of opposed signs are applied to electrodes on the first and second surfaces causing said particles to be aligned between the first surface electrodes and the second surface electrodes such that the colour of the particles does not significantly contribute to the colour of the pixel; and a second mode wherein voltages of opposed signs are applied to alternate electrodes on the first said surface and no voltage is applied to the electrodes on the second said surface such that the colour of the particles does determine the colour of the pixel.

2. A display as claimed in claim 1 wherein the electrodes on the first surface are generally elongate and extend along the sides of said pixel.

3. A display as claimed in claim 1 wherein the electrodes on the first surface overly the electrodes on the second surface.

4. A display as claimed in claim 3 wherein the disposition of electrodes on the two surfaces are identical.

5. A display as claimed in claim 1 wherein the liquid is transparent and in the said first mode the colour of the pixel is determined by the colour of the second surface.

6. A display as claimed in claim 1 wherein the liquid is coloured and in the said first mode the colour of the pixel is determined by the colour of liquid.

7. A display as claimed in claim 1 wherein said first surface is an upper surface on which light is incident.

8. A display as claimed in claim 1 wherein said first surface is a bottom surface.

9. A display as claimed in claim 1 wherein means are provided for accelerating a transition from said first mode to said second mode by reversing the polarity of the opposed electrode pairs on the first and second surfaces.

* * * * *